United States Patent
Valva et al.

(10) Patent No.: US 12,359,617 B2
(45) Date of Patent: Jul. 15, 2025

(54) AXIAL TRANSFER BEARING

(71) Applicant: RTX CORPORATION, Farmington, CT (US)

(72) Inventors: Christopher M. Valva, Manchester, CT (US); Todd A. Davis, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/365,475

(22) Filed: Aug. 4, 2023

(65) Prior Publication Data
US 2025/0043722 A1 Feb. 6, 2025

(51) Int. Cl.
| | |
|---|---|
| *F02C 7/06* | (2006.01) |
| *F01D 25/18* | (2006.01) |
| *F02C 7/36* | (2006.01) |
| *F16C 33/78* | (2006.01) |
| *F16H 57/04* | (2010.01) |

(52) U.S. Cl.
CPC ............... *F02C 7/06* (2013.01); *F01D 25/18* (2013.01); *F02C 7/36* (2013.01); *F16C 33/783* (2013.01); *F01D 25/183* (2013.01); *F05D 2240/54* (2013.01); *F05D 2240/55* (2013.01); *F16C 2360/23* (2013.01); *F16H 57/043* (2013.01)

(58) Field of Classification Search
CPC .... F02C 7/06; F02C 7/36; F01D 25/18; F01D 25/183; F04D 29/063; F16H 57/0479; F16H 57/043
See application file for complete search history.

(56) References Cited

U.S. PATENT DOCUMENTS

| | | | |
|---|---|---|---|
| 5,658,127 A  * | 8/1997 | Bond | .................... F01D 25/183 |
| | | | 415/230 |
| 6,565,095 B2 | 5/2003 | Meacham | |
| 7,214,157 B2 * | 5/2007 | Flamang | ................. F03D 80/70 |
| | | | 184/6.12 |
| 7,753,817 B2 * | 7/2010 | Ryymin | .............. F16H 57/0482 |
| | | | 475/342 |
| 10,352,456 B2 | 7/2019 | Amador et al. | |
| 11,401,985 B2 * | 8/2022 | Mantovan | ............. F16D 41/067 |
| 2012/0277055 A1 | 11/2012 | Sheridan | |

(Continued)

FOREIGN PATENT DOCUMENTS

| | | | | |
|---|---|---|---|---|
| DE | 102015223554 A1 | * | 6/2017 | ............. F16H 57/04 |
| DE | 102018219011 B3 | * | 2/2020 | |
| DE | 102019212444 A1 | * | 2/2021 | |

OTHER PUBLICATIONS

English Translation of DE102018219011B3 (Year: 2020).*

(Continued)

*Primary Examiner* — Woody A Lee, Jr.
*Assistant Examiner* — Wesley Le Fisher
(74) *Attorney, Agent, or Firm* — Carlson, Gaskey & Olds, P.C.

(57) ABSTRACT

A fan drive gear system for a turbine engine includes a carrier that supports rotation of a plurality of planet gears and is rotatable about an engine longitudinal axis. The carrier includes an axially facing seal plate that defines a lubricant passage to the carrier. A transfer bearing assembly has a seal member that defines a lubricant supply path to the seal plate and at least one biasing member that biases the seal member against the seal plate.

17 Claims, 4 Drawing Sheets

(56) References Cited

U.S. PATENT DOCUMENTS

2016/0069212 A1     3/2016   McCune et al.
2017/0114887 A1     4/2017   Miller et al.
2019/0032770 A1     1/2019   McCune

OTHER PUBLICATIONS

English Translation of DE102019212444A1 (Year: 2021).*
English Translation of DE102015223554A1 (Year: 2017).*
Extended European Search Report for European Application No. 24192684.9 mailed Dec. 16, 2024.

* cited by examiner

AXIAL TRANSFER BEARING

BACKGROUND

A turbine engine typically includes a fan section, a compressor section, a combustor section and a turbine section. A speed reduction device such as an epicyclical gear assembly may be utilized to drive the fan section such that the fan section may rotate at a speed different than the turbine section so as to increase the overall propulsive efficiency of the engine. A carrier may support a plurality of planetary gears and rotate about an engine axis. Rotation of the carrier can present challenges to communicating lubricant to the planetary gears. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a carrier that supports rotation of a plurality of planet gears and is rotatable about an engine longitudinal axis, the carrier includes an axially facing seal plate that defines a lubricant passage to the carrier, a transfer bearing assembly that has a seal member that defines a lubricant supply path to the seal plate and at least one biasing member that biases the seal member against the seal plate, and a fan drive shaft that is coupled to the carrier.

In a further embodiment of the foregoing fan drive gear system, the transfer bearing assembly includes a static housing that supports the seal member and the biasing member.

In a further embodiment of any of the foregoing fan drive gear systems, the seal member includes an annular cavity that is in communication with the seal plate and at least one supply passage that is configured to direct lubricant flow into the annular cavity.

In a further embodiment of any of the foregoing fan drive gear systems, the transfer bearing assembly further includes an outer static seal against an outer peripheral surface of the seal member and an inner static seal that is configured to seal against an inner peripheral surface of the seal member.

In a further embodiment of any of the foregoing fan drive gear systems, the seal member includes a carbon material that is held within a seal carrier.

In a further embodiment of any of the foregoing fan drive gear systems, the biasing member is disposed about the outer peripheral surface of the seal member and is engaged to the seal carrier.

In a further embodiment of any of the foregoing fan drive gear systems, the biasing member includes a coil spring that generates an axially directed biasing force on the seal member.

In a further embodiment of any of the foregoing fan drive gear systems, each of the plurality of planet gears are supported by a journal bearing that is supported within the carrier and the carrier includes passages for communicating lubricant to each journal bearing.

In a further embodiment of any of the foregoing, the fan drive gear system further includes a sun gear and a ring gear that are both engaged to the plurality of planet gears. The sun gear is driven by an engine shaft and the ring gear is fixed relative to rotation of the carrier.

A turbine engine assembly according to another exemplary embodiment of this disclosure, among other possible things includes, a fan drive gear system that includes a sun gear that is coupled to a plurality of planetary gears circumscribed by a ring gear. The planetary gears are supported in a carrier that is rotatable about an engine longitudinal axis. The carrier includes a seal plate that is transverse to the engine longitudinal axis that defines a lubricant passage to the carrier. A transfer bearing assembly has a seal member that defines a lubricant supply path to the seal plate and at least one biasing member biases the seal member against the seal plate. A fan drive shaft is coupled to the carrier. A lubrication system is configured to provide a flow of lubricant to the transfer bearing assembly.

In a further embodiment of the foregoing turbine engine assembly, the transfer bearing assembly includes a static housing that supports the seal member and the biasing member.

In a further embodiment of any of the foregoing turbine engine assemblies, the seal member includes an annular cavity that is in communication with the seal plate and at least one supply passage that is configured to direct lubricant flow into the annular cavity.

In a further embodiment of any of the foregoing turbine engine assemblies, the seal member is supported within a seal carrier and includes a carbon material.

In a further embodiment of any of the foregoing turbine engine assemblies, the static housing defines a lubricant chamber that is configured to communicate lubricant to the seal member. The lubricant chamber includes an outer static seal and an inner static seal that are configured to contain lubricant within a lubricant chamber.

In a further embodiment of any of the foregoing turbine engine assemblies, the biasing member is disposed about an outer peripheral surface of the seal member and engaged between the seal carrier and a portion of the static housing.

In a further embodiment of any of the foregoing turbine engine assemblies, each of the plurality of planet gears are supported by a journal bearing that is supported within the carrier and the carrier includes passages for communicating lubricant to each journal bearing.

A method of communicating lubricant to a fan drive gear system according to another exemplary embodiment of this disclosure, among other possible things includes, configuring a seal member to be biased against an axially facing rotating seal plate of a carrier. The carrier is rotatable about an engine axis and supports a plurality of planet gears. A lubrication system is configured to provide a flow of lubricant to the seal member.

In a further embodiment of the foregoing, the method further includes configuring a static housing to support axial movement of the seal member against the rotating seal plate and communicating the flow of lubricant to the seal member.

In a further embodiment of any of the foregoing, the method further includes configuring a fixed seal against surfaces of the seal member to contain a flow of lubricant directed to the seal member.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
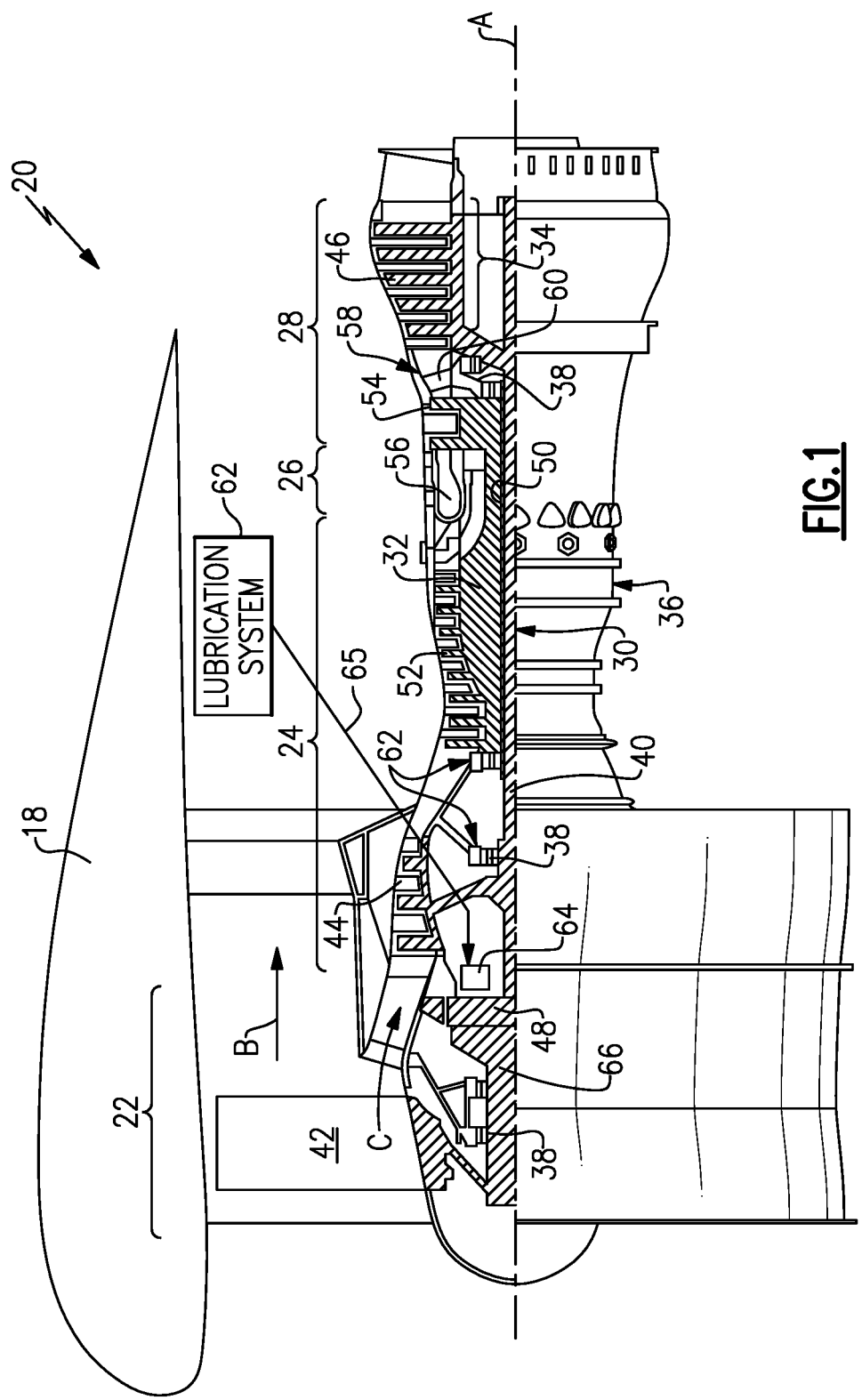
FIG. 1 is a schematic view of an example gas turbine engine including planetary fan drive gear system embodiment.

FIG. 1 schematically illustrates a gas turbine engine 20 with a lubrication system 62 that provides a flow of lubricant to a planetary epicyclic fan drive gear system 48 through an axial transfer bearing assembly 64. The example fan drive gear system 48 includes a rotating carrier and a fixed ring gear. A lubricant flow 65 to the gear system 48 is communicated axially to the rotating carrier through the example transfer bearing assembly 64.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan 42 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. In a further example, the engine 20 bypass ratio is greater than about six (6), with an example embodiment being greater than about ten (10) and less than about twenty (20).

The fan drive gear system 48 is an epicycle gear train, such as a planetary gear system with a gear reduction ratio of greater than about 2.3:1 and less than about 10:1. The gear system 48 is coupled to a fan shaft 66 to drive the fan section 22 about the engine axis A. It should be understood, however, that the above parameters are only exemplary of one embodiment of a geared architecture engine and that the present disclosure is applicable to other gas turbine engines including direct drive turbofans.

Figure 2:
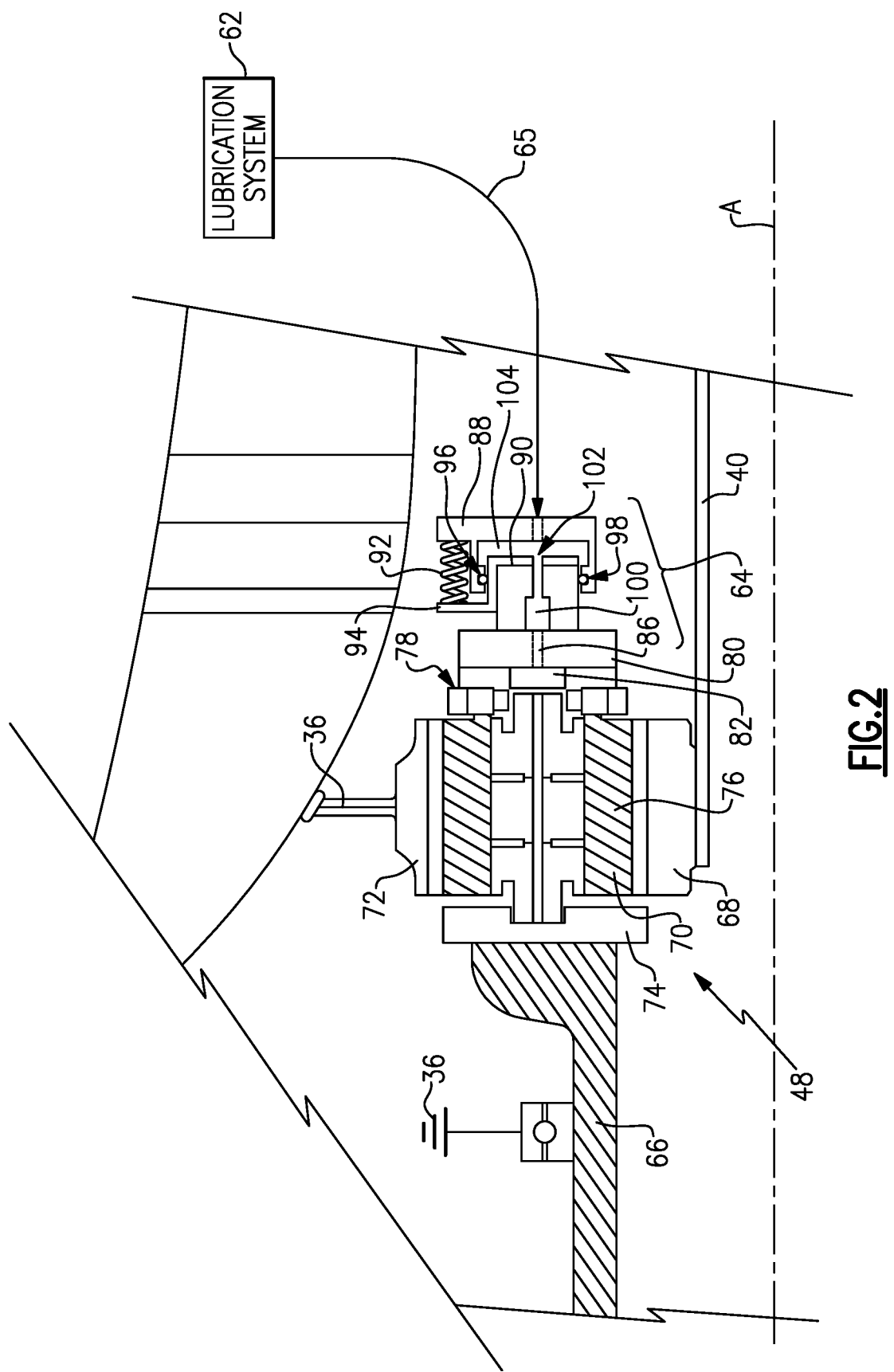
FIG. 2 is an enlarged schematic view an example fan drive gear system embodiment.

Referring to FIG. 2 with continued reference to FIG. 1, the example fan drive gear system 48 is an epicyclic gear system with a sun gear 68 engaged to a plurality of planet gears 70 supported in a rotating carrier 74. A ring gear 72 circumscribes the planet gears 70 and is fixed to a static engine structure 36. The sun gear 68 is driven by an engine shaft 40. The carrier 74 rotates about the engine axis A and is coupled to the fan shaft 66. Accordingly, the carrier 74 provides the driving output utilized to drive the fan section 22.

Each of the plurality of planet gears 70 is supported for rotation by a journal bearing 76. The journal bearing 76 and the gear interfaces require lubricant that is supplied through the transfer bearing assembly 64. The transfer bearing assembly 64 provides for the communication of a flow of lubricant 65 from engine static structures to the rotating carrier 74.

Figure 3:
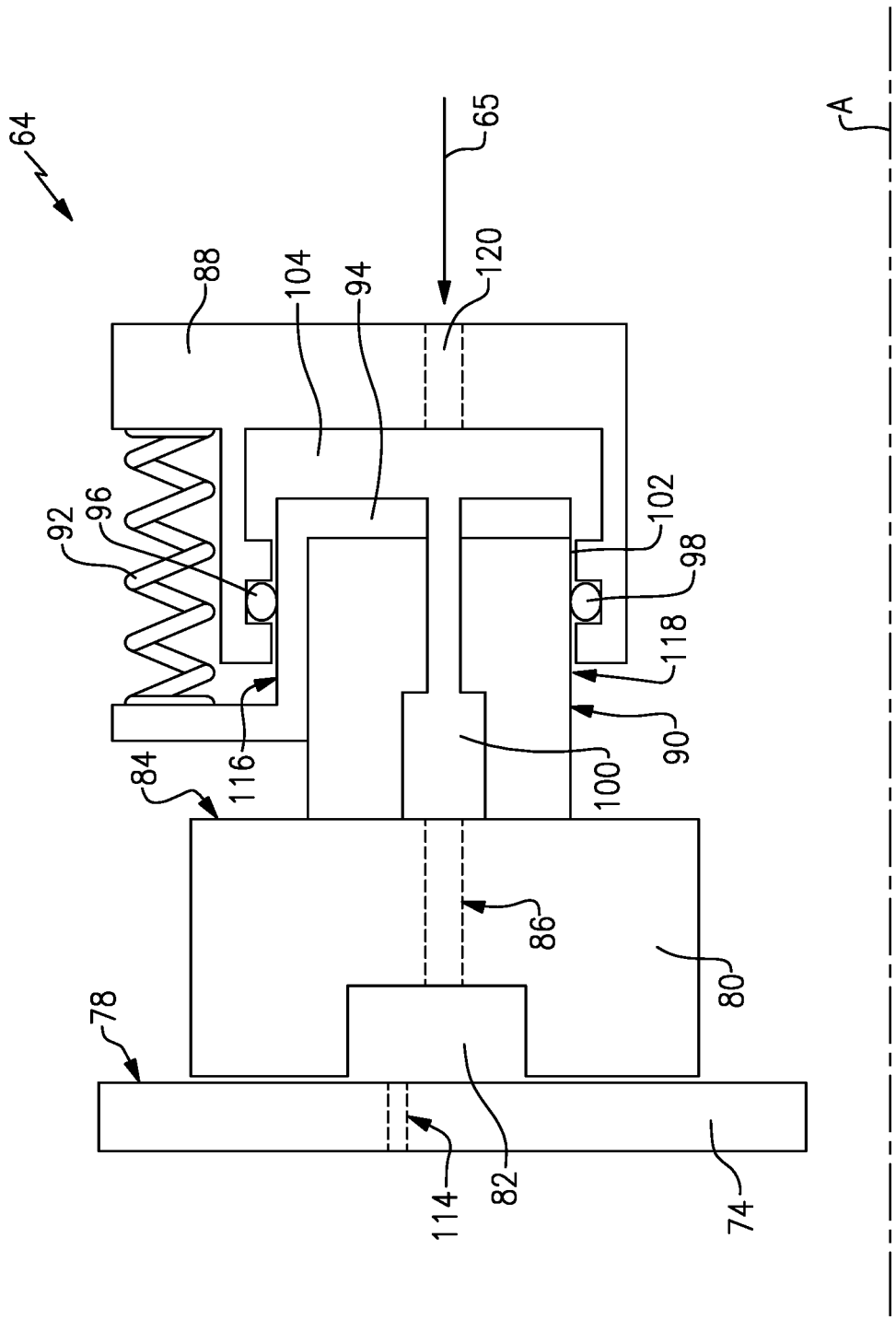
FIG. 3 is an enlarged schematic view of an example transfer bearing assembly embodiment.
Figure 4:
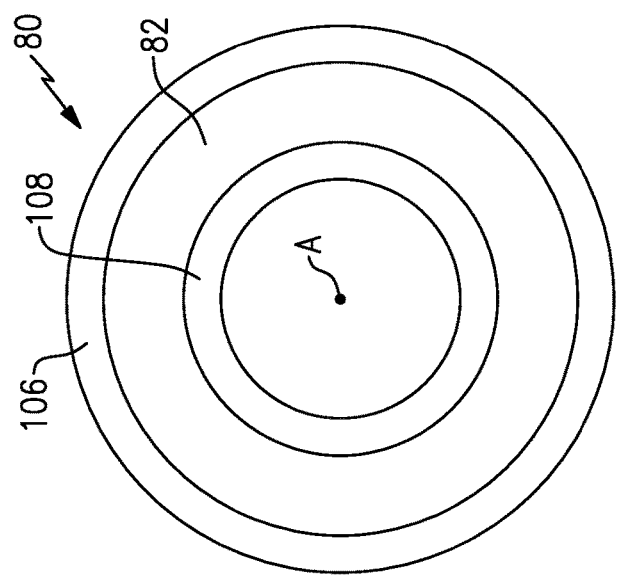
FIG. 4 is a plan view of an annular cavity of an example seal plate of the transfer bearing assembly embodiment.
Figure 5:
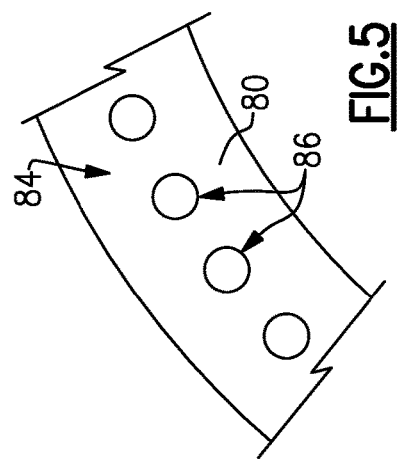
FIG. 5 is a schematic view of a portion of an axial face of the example seal plate.

Referring to FIGS. 3, 4 and 5 with continued reference to FIG. 2, a seal plate 80 is attached to an axial face 78 of the carrier 74. The seal plate 80 is annular and rotates about the engine axis A with the carrier 74. The seal plate 80 provides an axially facing rotating seal face 84. The seal plate 80 includes an annular cavity 82 defined between a radially outer wall 106 and a radially inner wall 108. The annular cavity 82 receives lubricant through a plurality of passages 86 through the axial face 84. Lubricant from the annular cavity 82 is communicated into the carrier 74 and the journal bearing 76. Although the example seal plate 80 includes the annular cavity 82 as an example embodiment, other configurations without the annular cavity 82 could be utilized within the scope and contemplation of this disclosure. Passages within the journal bearing 76 communicate lubricant to the rotating planet gear 70.

Referring to FIG. 3, the transfer bearing assembly 64 includes a seal member 90 that is biased against the rotating seal plate 80. The seal member 90 is axially movable and biased against the axial face 84 of the seal plate 80. The example seal member 90 is pressed against the seal face 84 by an axial biasing force provided by biasing members 92. In one example embodiment, the seal member 90 is formed from a carbon material, however, other materials with desirable wear properties may also be utilized and are within the contemplation of this disclosure.

In this example embodiment, the biasing members 92 comprise compression springs that are disposed about an outer periphery of the seal member 90. Other biasing members and or assemblies could be utilized and are within the contemplation and scope of this disclosure.

The seal member 90 is supported by a seal carrier 94 and a static housing 88. In one example embodiment, the seal member 90 is press fit into the seal carrier 94. The static housing 88 includes a lubricant supply chamber 104 that receives lubricant flow 65. The seal member 90 includes a plurality of passages 102 in communication with the supply chamber 104. An outer static seal 96 and an inner static seal 98 are fixed relative to axial movement of the seal member 90. The outer static seal 96 is engaged to an outer peripheral surface 116 of the seal carrier 94. The inner static seal 98 is engaged against an inner peripheral surface 118 of the seal member 90.

Figure 6:
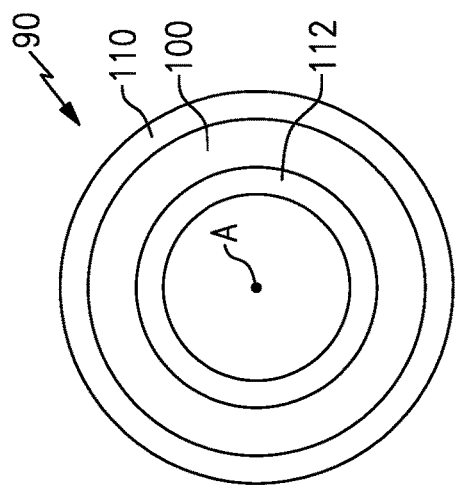
FIG. 6 is a plan view of an annular cavity of an example seal member of the transfer bearing assembly embodiment.
Figure 7:
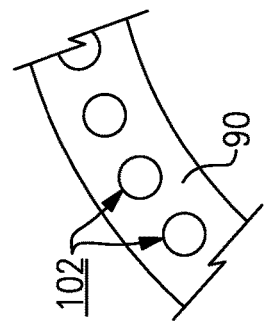
FIG. 7 is a schematic view of a portion of an axial face of the example seal member.

Referring to FIGS. 6 and 7 with continued reference to FIG. 3, the seal member 90 includes the annular cavity 100 defined between an outer wall 110 and an inner wall 112. The passages 102 extend through the seal member 90 to communicate lubricant from the supply chamber 104 to the annular cavity 100.

Referring to FIGS. 2 and 3, in one example operational embodiment, a flow of lubricant 65 is provided to the supply chamber 104 through passages 120 of the housing 88. Lubricant is provided at a pressure that drives flow through the transfer bearing assembly 64. Lubricant from the supply chamber 104 is communicated into the annular cavity 100 of the seal member 90. From the annular cavity 100, lubricant passes into the annular cavity 82 of the seal plate 80 by way of the passages 86. From the cavity 82, lubricant is distributed into the carrier 74 and the journal bearings 76. Moreover, lubricant may be supplied to other features of the gear system 48 through the carrier 74.

Sealing between the rotationally fixed seal member 90 and the rotating seal plate 80 is generated by the axially directed biasing force provided by the biasing members 92. The axial interface between the seal member 90 and the seal plate 80 are substantially parallel to generate the desired lubricant seal.

Accordingly, the example transfer bearing assembly 64 provides a flow of lubricant to the rotating carrier 74, journal bearings 76 and other gear system components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
    a carrier supporting rotation of a plurality of planet gears and rotatable about an engine longitudinal axis, the carrier including an axially facing seal plate that defines a lubricant passage to the carrier;
    a transfer bearing assembly having a seal member that defines a lubricant supply path to the seal plate, a seal carrier supporting the seal member, a static housing, and at least one biasing member biasing the seal member against the seal plate, wherein the seal member seals against the seal plate, the static housing supports axial movement of the seal member and the seal carrier, a static seal supported by the static housing seals against a radial surface of the seal member, and the at least one biasing member is disposed about an outer periphery of the seal member between the seal carrier and a portion of the static housing; and
    a fan drive shaft coupled to the carrier.

2. The fan drive gear system as recited in claim 1, wherein the seal member includes an annular cavity in communication with the seal plate and at least one supply passage configured to direct lubricant flow into the annular cavity.

3. The fan drive gear system as recited in claim 2, wherein the static seal comprises an outer static seal that seals against an outer peripheral surface of the seal carrier and an inner static seal configured to seal against an inner peripheral surface of the seal member.

4. The fan drive gear system as recited in claim 3, wherein the seal member comprises a carbon material that is held within the seal carrier.

5. The fan drive gear system as recited in claim 4, wherein the at least one biasing member is disposed about the outer periphery of the seal member and engaged to the seal carrier.

6. The fan drive gear system as recited in claim 5, wherein the at least one biasing member comprises a coil spring generating an axially directed biasing force on the seal member.

7. The fan drive gear system as recited in claim 6, wherein each of the plurality of planet gears are supported by a journal bearing supported within the carrier and the carrier includes passages for communicating lubricant to each journal bearing.

8. The fan drive gear system as recited in claim 7, further including a sun gear and a ring gear both engaged to the plurality of planet gears, wherein the sun gear is driven by an engine shaft and the ring gear is fixed relative to rotation of the carrier.

9. A fan drive gear lubrication system for a turbine engine comprising:
    a seal plate configured for attachment to an axial face of a rotatable carrier, wherein the seal plate defines a lubricant passage to the rotatable carrier and components supported in the rotatable carrier;
    a rotationally fixed seal member that defines a lubricant supply path to the seal plate;
    a seal carrier supporting the seal member, the seal carrier including a radially outer peripheral surface;
    at least one biasing member biasing the seal carrier and the seal member against the seal plate;
    a static housing supporting the seal member and the at least one biasing member such that both the seal member and the seal carrier are movable axially against the seal plate;
    a static seal supported by the static housing and sealing against a radial surface of the seal member, wherein the at least one biasing member is disposed about an outer periphery of the seal member between the seal carrier and a portion of the static housing.

10. The fan drive gear lubrication system as recited in claim 9, wherein the seal member includes an annular cavity in communication with the seal plate and at least one supply passage configured to direct lubricant flow into the annular cavity.

11. The fan drive gear lubrication system as recited in claim 10, wherein the static seal further comprises an outer static seal that seals against the radially outer peripheral surface of the seal carrier and an inner static seal configured to seal against an inner peripheral surface of the seal member.

12. The fan drive gear lubrication system as recited in claim 9, wherein a plurality of planet gears are supported by a corresponding plurality of journal bearings supported within the rotatable carrier and the rotatable carrier includes passages for communicating lubricant to each of the plurality of journal bearings.

13. A turbine engine assembly comprising:
a fan drive gear system including a sun gear coupled to a plurality of planetary gears circumscribed by a ring gear, the planetary gears supported in a carrier that is rotatable about an engine longitudinal axis, the carrier including a seal plate that is transverse to the engine longitudinal axis that defines a lubricant passage to the carrier;
a transfer bearing assembly comprising:
a seal member that defines a lubricant supply path to the seal plate and at least one biasing member biasing the seal member against the seal plate, wherein the seal member comprises a carbon material and includes an annular cavity in communication with the seal plate and at least one supply passage configured to direct lubricant flow into the annular cavity;
a static housing supporting the seal member and the at least one biasing member, wherein the static housing defines a lubricant chamber configured to communicate lubricant to the seal member, the lubricant chamber including an outer static seal and an inner static seal configured to contain lubricant within the lubricant chamber;
a seal carrier supporting the seal member, wherein the at least one biasing member is disposed about an outer peripheral surface of the seal member between the seal carrier and a portion of the static housing;
a fan drive shaft coupled to the carrier; and
a lubrication system configured to provide a flow of lubricant to the transfer bearing assembly.

14. The turbine engine assembly as recited in claim 13, wherein each of the plurality of planetary gears are supported by a journal bearing supported within the carrier and the carrier includes passages for communicating lubricant to each journal bearing.

15. The turbine engine assembly as recited in claim 13, further comprising a compressor section, a combustor section and a turbine section, wherein an inlet airflow is compressed in the compressor section, mixed with fuel in the combustor section and ignited to generate an exhaust gas flow expanded through the turbine section to drive an engine shaft that is coupled to drive the sun gear of the fan drive gear system.

16. The turbine engine assembly as recited in claim 15, wherein the ring gear is fixed to a static structure.

17. The turbine engine as recited in claim 16, further comprising a fan section driven by the fan drive shaft by rotation of the carrier.

* * * * *